United States Patent
Viola et al.

(10) Patent No.: US 8,664,344 B2
(45) Date of Patent: Mar. 4, 2014

(54) PROCESS FOR THE PREPARATION OF BRANCHED POLYBUTADIENE WITH A HIGH CONTENT OF 1,4-CIS UNITS

(75) Inventors: Gian Tommaso Viola, Cervia (IT); Marianna Zinna, Ravenna (IT)

(73) Assignee: Polimeri Europa S.p.A., San Donato Milanese (IT)

( * ) Notice: Subject to any disclaimer, the term of this patent is extended or adjusted under 35 U.S.C. 154(b) by 511 days.

(21) Appl. No.: 12/935,780

(22) PCT Filed: Mar. 19, 2009

(86) PCT No.: PCT/EP2009/002218
§ 371 (c)(1),
(2), (4) Date: Jan. 3, 2011

(87) PCT Pub. No.: WO2009/121516
PCT Pub. Date: Oct. 8, 2009

(65) Prior Publication Data
US 2011/0112261 A1    May 12, 2011

(30) Foreign Application Priority Data
Apr. 2, 2008   (IT) .............................. MI2008A0570

(51) Int. Cl.
*C08F 4/44* (2006.01)
*C08F 4/52* (2006.01)
*C08F 36/06* (2006.01)

(52) U.S. Cl.
USPC ........... 526/164; 526/159; 526/153; 526/151; 526/148; 526/91; 526/138; 526/335

(58) Field of Classification Search
USPC ........................ 526/335, 148, 151, 153, 164
See application file for complete search history.

(56) References Cited

U.S. PATENT DOCUMENTS

| 4,710,553 | A  | * | 12/1987 | Carbonaro et al. | ........... 526/142 |
| 5,428,119 | A  |   | 6/1995  | Knauf et al. | |
| 6,482,906 | B1 | * | 11/2002 | Tocchetto Pires et al. | .... 526/164 |
| 6,482,930 | B1 |   | 11/2002 | Kwag et al. | |
| 7,030,195 | B2 | * | 4/2006  | Viola et al. | ................. 525/333.2 |
| 7,112,632 | B2 | * | 9/2006  | Viola et al. | ................... 525/193 |
| 2005/0182213 | A1 | * | 8/2005 | Viola et al. | ................... 526/164 |
| 2006/0089472 | A1 |   | 4/2006 | Viola et al. | |

FOREIGN PATENT DOCUMENTS

| EP | 0 652 240 | 5/1995 |
| EP | 1 134 233 | 9/2001 |
| EP | 1 557 433 | 7/2005 |
| EP | 1 650 227 | 4/2006 |

OTHER PUBLICATIONS

International Search Report issued Jul. 24, 2009 in PCT/EP09/02218 filed Mar. 19, 2009.
Quirk, R.P. et al., "Butadiene polymerization using neodymium versatate-based catalysts: catalyst optimization and effects of water and excess versatic acid", Polymer, vol. 41, pp. 5903-5908, XP002535970, (Jul. 1, 2000).
Oehme, Annekatrin et al., "The influence of ageing and polymerization conditions on the polymerization of butadiene using a neodymium catalyst system", Die Angewandte Makromolekulare Chemie, vol. 235, No. 4098, pp. 121-130, XP002535971, (Feb. 1, 1996).
Wilson, J. David et al., "Butadiene polymerization using ternary neodymium-based catalyst systems", Polymer Bulletin, vol. 34, pp. 257-264, XP002535985, (Mar. 1, 2005).

* cited by examiner

*Primary Examiner* — Rip A. Lee
(74) *Attorney, Agent, or Firm* — Oblon, Spivak, McClelland, Maier & Neustadt, L.L.P.

(57) ABSTRACT

Process for the preparation of polybutadiene effected by the polymerization of butadiene in an aliphatic and/or cyclo-aliphatic solvent in the presence of a catalytic system prepared in situ which comprises: (i) a carboxylate of neodymium soluble in the process solvent containing a variable quantity of water, the $H_2O/Nd$ molar ratio ranging from 0.001/1 to 0.50/1; (ii) an alkyl compound of aluminum; (iii) an alkyl compound of aluminum in which at least one bond of Al consists of an Al—Cl bond; The total Al/Nd molar ratio ranging from 4/1 to 12/1, and the Cl/Nd molar ratio ranging from 2/1 to 6/1.

18 Claims, No Drawings

PROCESS FOR THE PREPARATION OF BRANCHED POLYBUTADIENE WITH A HIGH CONTENT OF 1,4-CIS UNITS

The present invention relates to a process for the preparation of polybutadiene with a high content of 1,4-cis units, said process being effected in the presence of a catalytic system obtained by the reaction between (i) a carboxylate of neodymium, preferably neodymium versatate, (ii) an alkyl derivative of aluminum, (iii) a chlorinated compound of an aluminum alkyl, fed directly into the reaction environment, in such quantities that the quantity of Nd ranges from 1 to 3 mmoles/Kg of butadiene and the Al/Nd molar ratio ranges from 4/1 to 12/1, and the Cl/Nd molar ratio is within the range of 2/1:6/1.

More specifically, the present invention relates to a process for the preparation of polybutadienes with a high content of 1,4-cis units which allows both the molecular weight distribution and the branching degree to be modulated. In other words, the process of the present invention allows the preparation, in continuous reactors, of branched polybutadienes with a high cis content and with a molecular weight distribution whereby the polydispersion index indicated by the Mw/Mn ratio can vary from 1.9 to 2.5 (in this case it will be a narrow molecular weight distribution) up to ranges of between 2.5 and 4 (in this case the molecular weight distribution will be indicated as wide).

For the sake of simplicity, when not otherwise indicated, the term polybutadiene refers, in the following description, to a polybutadiene with a content of 1,4-cis units higher than 90%.

As the rheological characteristics of polybutadiene (as of other polymers) are a direct consequence of the molecular weight, molecular weight distribution and branching degree, the possibility of having the availability of means for modifying the structure of the polybutadiene on the same production plant allows a high range of products to be obtained, whose application varies from the modification of plastic materials (HIPS) to the tyre industry.

With respect to the use of polybutadienes in the construction of treads, these are normally linear or branched polybutadienes whose branching degree is limited, however, to avoid the excessive elasticity of the raw rubber, a characteristic which makes the englobement of the fillers difficult. EP-A-1,557,433 and EP-A-1,650,227 describe two different processes for their production. Both processes envisage a first step for the preparation of polybutadienes having a narrow molecular weight distribution (Mw/Mn<2.5 orientatively). In a subsequent step, the polybutadienes thus obtained are subjected to a post-modification reaction, in the case of EP-A-1,557,433 by means of peroxide substances, in the case of EP-A-1,650,227 by means of coupling agents belonging to the group of epoxidated vegetable oils or resins functionalized with polar groups possibly maleinized. The branched structures were prepared according to two different mechanisms. Whereas the use of peroxides, in fact, caused the formation of macro-radicals preferably on the high-molecular-weight fraction generating a branching oriented on high molecular weights (long chain branching), in the second case, the terminals still active at the end of the conversion were involved in the coupling reaction; in this way, due to the greater abundance of active terminals belonging to low-molecular-weight chains, a branching with a higher degree of the latter was obtained.

Both of the above processes have drawbacks. They cannot be carried, in fact, beyond a certain level, otherwise there is the formation of insoluble fractions. Furthermore, two reaction steps are always required, a polymerization step to linear polybutadiene and a second branching step of the linear polybutadiene previously obtained. Due to the fact, as already mentioned, that the branching degree cannot be carried over a certain limit without the appearance of an insoluble fraction, both of these processes are only suitable for the production of polybutadiene for tyres with Mooney viscosity values measured at 100° C. ranging from 40 to 50 and a viscosity of the solution at 5% by weight in styrene measured at 25° C. within the range of 180-400 cPs. With these viscosity values, the above polybutadienes are not suitable for use in the modification of plastic materials as for this field, the viscosity in styrene must be lower than 180 cPs and falls within a range in which the lower limit is 40 cPs, even with a Mooney viscosity not lower than 35.

With respect to the materials used as modifiers of plastic materials, on the other hand, these consist of polybutadiene with a molecular weight and structure which are such that its solution in styrene at 5% by weight has a low viscosity at 25° C., normally within the range of 40-180 cPs. In this way, suitable conditions are created for the preparation of a HIPS (High Impact PolyStyrene) with a morphology which is such as to have a good Izod value. This polybutadiene for the modification of plastic materials, possibly branched if types are requested with a very low viscosity in styrene, is normally synthesized anionically in reactors of the continuous or batch type.

If rubbers in which the vinyl unit is completely absent are required, polybutadienes synthesized with catalysts of the Ziegler-Natta type are used. Four different technologies using Ziegler-Natta catalysts can be used for the production of polybutadiene with a high content of 1,4-cis units: titanium, cobalt, nickel and neodymium. These are the metals which are most widely used for the preparation of this group of catalysts. The characteristics of the polybutadienes produced with these different types of metal are different with respect to both the molecular weight dispersion and also the branching degree; even if the content of the cis unit can be modified, it is generally kept high, and in any case >96%, by acting on the reaction conditions or on the stoichiometric ratios of the constituents of the catalyst, or by modifying the nature of the components of the mixture used in the preparation of the catalyst. In general, polymers synthesized with Nd, upon MALLS analysis, show an essentially linear structure with dispersion indexes centered on 3; polymers synthesized with titanium-based catalysts have a narrow molecular weight distribution (Mw/Mn=2.5-3) and an essentially linear structure; polymers synthesized with nickel have a relatively high MW dispersion (Mw/Mn=4-4.5), with a limited branching and equal to about 0.9 branches for every 1,000 C atoms, whereas polymers based on cobalt have a polydispersion index ranging from 3 to 3.5, with a sustained branching (1.7-2 branches/1,000 carbon atoms). The use of catalysts based on cobalt therefore allow branched polybutadienes to be prepared with a relatively limited polydispersion index; their viscosity in solution is consequently lower than that of polymers based on Ni or Ti or Nd. The use of catalysts based on Ti, Ni and Co, however, is problematical due to the toxicological characteristics of the metal (Co and Ni) and consequently, in the case of Co and Ni, to the necessity of availing of an effective extraction section of the metal from the polymeric solution.

Furthermore, the use of catalysts based on Ti, Co and Ni requires the use of aromatic solvents, as the catalytic complexes useful for the polymerization are insoluble in aliphatic or cyclo-aliphatic solvents.

Experts in the field therefore felt the necessity of availing of a polymerization system in which the use of a salt of a non-toxic metal soluble in an aliphatic solvent would allow a wide range of products to be covered, from use for tyres (linear to moderately branched polybutadienes) to that of the modification of plastic materials. It is known that polymerization catalysts based on organic salts of neodymium obtained by reacting a neodymium salt with an aluminum alkyl and a chlorinating substance are soluble in aliphatic or cyclo-aliphatic solvents. The polymers thus obtained, however, have an essentially linear structure with quite a wide molecular weight distribution.

EP-A-1,431,318 describes a process for the preparation of polybutadiene which uses a "preformed" and "sown" catalytic system comprising (a) a compound of neodymium; (b) an aluminum organ derivative containing at least one halogen atom; (c) an organometallic compound of aluminum having the general formula $AlR_1R_2R_3$, wherein $R_1$ and $R_2$ are selected from hydrogen and hydrocarbyl groups having from 1 to 10 carbon atoms, $R_3$ is a hydrocarbyl group having from 1 to 10 carbon atoms; (d) alumoxane and an aliquot of butadiene and (e) a bidentate chelating complexing agent such as acetyl-acetone. This is therefore a "preformed and prepolymerized" catalytic system. Under suitable process conditions (isotherms from 70° C. to 140° C., preferably from 80° C. to 120° C., or adiabatic with an initial temperature ranging from 50 to 90° C. and a final temperature of 100° C. to 150° C.) polybutadienes with extended branchings are obtained, which are such as to have (see table 5 of the above patent) a viscosity in a styrene solution at 5% within the range of 75 to 147 cPs and with a Mooney viscosity of 40 to 45. With this catalytic system, polymers having a branched structure were consequently obtained directly in synthesis. The preparation of the above catalyst, however, was complicated and not practical mainly due to the use of large quantities of alumoxane; furthermore, the necessity of preparing a prepolymerized catalyst, by the addition of butadiene on the preformed catalyst, caused the formation of extremely viscous solutions due to the association of the polar terminals of the oligomers formed, consequently with great difficulty in feeding the above preformed catalyst from the preparation container to the polymerization reactor in industrial practice.

A process has now been found which overcomes the drawbacks described above as it allows polybutadienes to be prepared, using a polymerization catalyst prepared in situ starting from an organic salt of neodymium in an aliphatic or cyclo-aliphatic solvent, in a single reaction step, which can be adopted in both the field of tyres and also in the field of modifiers of plastic materials in relation to the molecular parameters, mainly the molecular weight, the dispersion degree and branching degree. The process of the present invention, in fact, allows both the branching degree and the molecular weight distribution to vary within a wide range.

In accordance with this, the present invention relates to a process for the preparation of polybutadiene having the following characteristics:
content of 1,4-cis units higher than 92%, preferably higher than 95%;
Mooney viscosity from 30 to 70, preferably from 40 to 60;
$M_w/M_n$ from 1.9 to 4, preferably from 2 to 3;
branching index value ($g_M$) from 0.4 to 0.9, preferably from 0.5 to 0.80;
absolute viscosity in styrene (solution at 5% at a temperature of 25° C.) ranging from 100 to 450 cPs; the above preparation being characterized in that:
it is effected by means of the polymerization of butadiene in an aliphatic and/or cyclo-aliphatic solvent in the presence of a catalytic system prepared in situ which comprises:
(i) a carboxylate of neodymium soluble in the process solvent, preferably neodymium versatate, containing a variable quantity of water, the $H_2O/Nd$ molar ratio ranging from 0.001/1 to 0.50/1, preferably from 0.001/1 to 0.30/1;
(ii) an alkyl compound of aluminum;
(iii) an alkyl compound of aluminum in which at least one bond of Al consists of an Al—Cl bond;
the total Al/Nd molar ratio ranging from 4/1 to 12/1, and the Cl/Nd molar ratio ranging from 2/1 to 6/1.
it is effected in continuous at a temperature ranging from 70° C. to 130° C., preferably from 80° C. to 95° C.

The $g_m$ parameter (for its definition, see the experimental part) is an index of the linearity or non-linearity of the polybutadiene chain. A $g_m$ value equal to 1 is characteristic of a linear structure whereas values lower than 1 are typical of a branched chain. The lower the $g_m$ value, the greater the branching degree of the polymeric chain will be.

The term "Mooney viscosity" refers to the viscosity of the polymer measured at 100° C. with a wide rotor (L) by preheating for 1 minute and effecting the measurement for 4 minutes according to the method ASTM D 1646.

The solvent used in the process of the present invention is selected from aliphatic and cyclo-aliphatic hydrocarbons such as butane, pentane, hexane, heptane, cyclohexane, cyclopentane and the relative mixtures. As is known to experts in the field, the solvent must be as anhydrous as possible and free of protogenic substances. A distillation followed by treatment on beds of alumina and molecular sieves 3A or 4A is sufficient for obtaining a suitable solvent.

As far as the carboxylates of neodymium (i) are concerned, the preferred is neodymium versatate having the water content indicated above. The above versatates can be prepared according to what is described in US-A-6,090,926. The above neodymium versatates, however, should have a content of free versatic acid which is such that it does not exceed the RCOOH/Nd molar ratio of 0.5/1, preferably 0.3/1.

With respect to the alkyl compound of aluminum (ii), this is selected from one or more aluminum alkyls selected from those having the general formula (Ia) $Al(R)_3$ or (Ib) $AlH(R)_2$ wherein R represents an (iso)alkyl radical having from 1 to 10 carbon atoms. Typical examples of compounds (II) are trimethyl aluminum, triethyl aluminum, tri-n-propyl aluminum, tri-isopropyl aluminum, tri-n-butyl aluminum, tri-isobutyl aluminum, tripentyl aluminum, trihexyl aluminum, tricyclohexyl aluminum, trioctyl aluminum, diethyl aluminum hydride, di-n-propyl aluminum hydride, di-n-butyl aluminum hydride, di-isobutyl aluminum hydride, dihexyl aluminum hydride, di-isohexyl aluminum hydride. Among the above aluminum alkyls, triethyl aluminum, tri-isobutyl aluminum, diethyl aluminum hydride and di-isobutyl aluminum hydride are preferred.

As far as compound (iii) is concerned, this is selected from one or more compounds having the general formula $AlCl_xR_{(3-x)}$ with x=1 or 2 and R is an (iso)alkyl radical having from 1 to 10 carbon atoms. Typical examples are diethyl aluminum chloride, ethyl aluminum sesquichloride, ethyl aluminum dichloride.

With respect to the reaction conditions, the neodymium carboxylates are used in a quantity ranging from 0.1 to 5 mmoles per 1,000 grams of butadiene to be polymerized. When the quantity is lower than 0.1 mmoles, the reaction rate is reduced to unacceptable values, whereas when the quantity is higher than 5 mmoles, the concentration of the catalyst is excessively high and the average molecular weight of the polymer obtained is too low for use. The neodymium carboxylate is preferably used in a quantity ranging from 1 to 3 mmoles per 1,000 grams of butadiene. With reference to the $H_2O/Nd$ ratio used in the present invention, reference is made to the circumstance that it is almost impossible or in any case far from the restrictions of normal industrial practice to prepare a perfectly anhydrous neodymium carboxylate. It is possible, on the other hand, to prepare neodymium carboxylates, particularly neodymium versatates, with a varying content of water according to what is described in EP-A-1,840,112. Following what is indicated in the above patent, it is possible to prepare and characterize a neodymium carboxylate having an $H_2O/Nd$ ratio within the range specified above, in relation to the desired molecular weight distribution and branching degree. There will be a narrow distribution of the same, operating at the lowest $H_2O/Nd$ molecular ratios and, if the temperature is higher than 70° C. in relation to the residence time, a branching, also extended, will be observed in relation to the process parameters already mentioned. Operating within the range indicated above, on the contrary, but with higher $H_2O/Nd$ ratios, wider molecular weight distributions will be obtained with an increase in the above ratio with a progressive reduction, until the complete disappearance, in each branching.

In the process of the present invention, the molar ratio between the neodymium carboxylate component (i) and component (ii) normally ranges from 1/1 to 1/30, preferably from 1 to 1/10. The molar ratio between the neodymium carboxylate (i) and component (iii) usually ranges from 1/1.5 to 1/5, preferably from 1/2 to 1/4.

The organ derivative of aluminum containing chlorine (iii) is fed so that the ratio between the chlorine and non-chlorinated aluminum alkyl (ii) ranges from 0.5 to 5, preferably from 0.5 to 1.5.

In the preferred embodiment, the catalytic system used in the process of the present invention is formed by feeding the alkylating agent (ii) in a suitable quantity for maintaining the Mooney viscosity at the preferred values, the mixture consisting of the chlorinating agent (iii) and part of the alkylating agent (ii) and finally the solution of Nd-carboxylate, separately into the reaction environment.

The process of the present invention is also characterized in that it can be effected in a single step, at a temperature ranging from 70° C. to 130° C., the rise in temperature causing an increase in the branching and an increase in the $H_2O/Nd$ ratio creating a broadening of the molecular weight distribution and, at the same time, a progressive reduction in the branching degree, until its complete disappearance. The regulation of the branching degree also relates to the residence time inside the reactors; this parameter however is an inverse function of the process temperature and it is therefore extremely convenient to increase the temperature rather than the residence time, thus avoiding a reduction in the hourly productivity of the plant.

At the end of the polymerization, the polybutadiene is recovered by means of a so-called flash operation, in which the rapid decrease in the pressure causes the loss by evaporation of the residual monomer and part of the solvent with a consequent increase in the concentration of the polymer in solution.

The catalytic system is then quenched by means of protic substances, for example water.

It should be remembered that the process of the present invention is a process in continuous which can be carried out in one or more reactors, preferably in two reactors in series. Alternatively, it can also be carried out in batch reactors, care being taken to control the temperature which must be kept within the value limits specified above by vaporization of the solvent-monomer mixture which is condensed and re-fed into the reactor; this type of reactor is indicated by experts in the field as "boiling reactor".

In the preferred embodiment, the chlorinating species is fed in a mixture with an aliquot of the alkylating species so as to maintain an Al/Cl ratio ranging from 0.5/1 to 5/1, preferably from 0.5/1 to 1.5/1. The catalytic system of the present invention is preferably prepared by feeding (a) the alkylating agent in a suitable quantity for maintaining the Mooney viscosity at the preferred values, (b) the mixture consisting of the chlorinating agent and part of the alkylating agent and finally (c) the solution of Nd-carboxylate, separately into the reaction environment.

The process of the present invention has the considerable advantage of being simple and flexible.

As far as the flexibility is concerned, the two characterizing parameters ($H_2O/Nd$ ratio and temperature) can be modulated independently of each other, thus obtaining the desired branching degree and molecular weight distribution ($M_w/M_n$), in relation to the final application.

The possibility of modifying the branching degree and molecular weight distribution allows materials to be obtained, in which the elastic and viscous characteristics can be modified with a wide range enabling them to be used in very different fields, such as the modification of plastic materials (polystyrene) and the preparation of blends for tyre treads.

It is possible to prepare, for example, polymers which, although having the same Mooney (40), have a variation in the viscosity measured in a solution at 5% by weight at 22° C. within a range of 450 to 100 cPs: these differences in viscosity derive from a different molecular weight distribution whose polydispersion index passes from 4 to 2.5 respectively and, at the same time, from a higher branching which is practically absent in polymers with a greater viscosity and polydispersion index, becoming progressively important with a decrease in the molecular weight dispersion. As a non-limiting example, whereas in polymers with a high viscosity, the index value $g_M$ is at values close to 1 typical of linear polymers, for polymers having a low viscosity, it passes to values of up to 0.65 typical of polymers characterized by a distributed branching.

A further advantage of the present invention is that it is effected in a single step unlike the prior known art in which the preparation of linear polybutadiene was effected first, followed by its branching.

Finally the process is effected with an aliphatic solvent and in the presence of a non-toxic metal.

The following examples are provided for a better understanding of the present invention.

EXAMPLES

Characterization of the Polymers

Mooney viscosity, according to the method ASTM D 1646;

Analysis of the microstructure (cis content), according to the internal method via I.R. spectroscopy;

Absolute viscosity, measured in a solution of styrene at 5% w/w at T=25° C.;

Determination of the molecular mass distribution (MWD), according to the internal method via GPC in Tetrahydrofuran at T=25° C.;

Determination of the average molecular weight and measurement of the branching by means of the GPC/MALLS technique. By coupling a multi-angle light scattering detector (MALLS) with a traditional SEC/RI elution system, it is possible to contemporaneously effect the absolute measurement of the molecular weight and gyration radius of the macromolecules which are separated by the chromatograph system; the quantity of light scattered from a macromolecular species in solution can, in fact, be used directly for obtaining its molecular weight, whereas the angular variation of the scattering is directly correlated with its average dimensions. The fundamental relation which is used is the following:
wherein:

$$\frac{K^*c}{R_\theta} = \frac{1}{M_w P_\theta} + 2A_2 c \quad (1)$$

K*=optical constant, which depends on the wave-length of the light used, the dn/dc of the polymer, the solvent used
$M_w$=weight average molecular weight
c=concentration of the polymeric solution
$R_\theta$=scattered light intensity measured at an angle θ
$P_\theta$=function which describes the scattered light variation with the angle at which it is measured, equal to 1 for an angle θ equal to 0.

For very low concentrations (typical of a GPC system, (1) is reduced to $$\frac{K^*c}{R_\theta} = \frac{1}{M_w P_\theta} \quad (2)$$

and effecting the measurement on various angles, the extrapolation at zero angle of the function $K^*c/R_\theta$ in relation to sen² θ/2 directly provides the molecular weight from the intercept value and gyration radius from the slope.

Furthermore, as this measurement is effected for every slice of the chromatogram, it is possible to obtain a distribution of both the molecular weight and also of the gyration radius.

The macromolecular dimensions in solution are directly correlated to their branching degree: with the same molecular weight, the smaller the dimensions of the macromolecule with respect to the corresponding linear macromolecule, the higher the branching degree will be; the information relating to the macrostructure of a polymer is deduced in two ways:
1. Qualitatively, from the value of the parameter α, which represents the slope of the curve which correlates the gyration radius with the molecular weight: when, under the same analysis conditions, this value decreases with respect to a macrostructure of the linear type, there is the presence of a polymer having a branched-type macrostructure; the typical value for a high-cis linear polybutadiene in THF is equal to 0.58-0.60.
2. Quantitatively, by evaluating the branching index $g_M$, which is defined for each macromolecule, as a ratio between the average quadratic gyration radius of the branched macromolecule with that of the linear macromolecule, having the same molecular weight:

$$g_{M_i} = \left[\frac{\langle r^2 \rangle_b}{\langle r^2 \rangle_l}\right]_{M_i} \quad (3)$$

The average branching index $g_M$ represents the average of said ratio along the molecular mass distribution, and ranges from 0 to 1.

Neodymium Versatate Used in the Preparation of the Polymers

The synthesis of the polymers are effected using different types of Nd-versatate, (Nd1-Nd5), characterized by the presence of different aliquots of water and free versatic acid, in particular as shown in the following summarizing table.

| | RCOOH/Nd (moles/moles) | H$_2$O/Nd (moles/moles) |
|---|---|---|
| Nd1 | 0.5 | 0.5 |
| Nd2 | 0.3 | 0.30 |
| Nd3 | 0.3 | 0.1 |
| Nd4 | 0.3 | 0.03 |
| Nd5 | 0.3 | 0.001 |

Comparative Examples 1-6

Synthesis of Polybutadienes A-F

It is demonstrated that in a batch polymerization, the progressive decrease in protogenic substances (free RCOOH and H$_2$O) causes a progressive improvement in the properties of the polymer (lower Mw/Mn) and a lower consumption of Nd for preparing polymers having comparable Mooney viscosities. In all the cases described, the polymers are linear even if the polymerization is carried out at a higher temperature (compare example 6 in which the operating temperature is 80° C., with respect to the other examples in which the operating temperature is 60° C.). The characteristics of the above polybutadienes are indicated in Table 1.

Comparative Example 1

Synthesis of Polymer A Effected in a Batch Reactor 10 kg of an anhydrous hydrocarbon solvent consisting of a mixture of hexanes and brought to a temperature of 60° C. are fed to a 20-litre autoclave equipped with a stirrer and cooling system. The following products are added to this solvent in order: 1,200 g of anhydrous butadiene, Nd versatate of the type Nd1, corresponding to 2.8 mmoles of Nd per 1,000 g of butadiene, DIBAH (di-isobutyl aluminum hydride) in such a quantity that the final DIBAH:Nd molar ratio is equal to 6 and, finally, a mixture of DIBAH-DEAC (diethyl aluminum chloride) (1:1) in such a quantity that the Cl:Nd molar ratio is equal to 3. After 90' the reaction is considered complete and interrupted; a conversion equal to 94% is measured. The polymeric solution is extracted from the reaction container and a phenolic antioxidant is added (Irganox® 1520, in a quantity of 0.06% with respect to the polymer); the polymeric solution is then fed to a container containing boiling water by the entry of vapour and stirred; the solvent is thus eliminated and the coagulate is collected, which is previously pressed in a cold calender and subsequently completely dried in a roll calender at 80° C.

The $M_w$ measured by GPC has a value of 390,000, whereas the dispersion index $M_w/M_n$ measured via GPC is equal to 3.8. Upon MALLS analysis, the polymer proves to be linear ($g_M$=1), the cis content is equal to 96.1% and the Mooney viscosity 42.

Comparative Example 2

Synthesis of Polymer B Effected in a Batch Reactor

Under the same conditions indicated in Example 1, using however Nd versatate of the type Nd2 in a quantity of 2.5 mmoles of Nd/Kg of butadiene, DIBAH in such a quantity that the final DIBAH:Nd molar ratio is equal to 5 and, finally, a mixture of DIBAH-DEAC (1:1) in such a quantity that the Cl:Nd molar ratio is equal to 3, a polymer is prepared having the characteristics indicated in Table 1. After 90' the conversion is equal to 96.5%. After adding 0.06% w with respect to the polymer of Irganox® 1520, the solvent is eliminated using the same procedure described above; analysis of the polymer shows differences with respect to the previous point: in particular, $M_w$ GPC is equal to 380,000 and the dispersion index is equal to 3.2. The $g_M$ value is equal to 1, indicating a linear polymer. The cis content is equal to 95.8% and the Mooney viscosity 44.

Comparative Example 3

Synthesis of Polymer C Effected in a Batch Reactor

Under the same conditions indicated in Example 1, the quantity of Nd versatate of the type Nd3 is reduced to 2.2 mmoles per 1,000 g of butadiene, DIBAH in such a quantity that the final DIBAH:Nd molar ratio is equal to 4.2 and, finally, a mixture of DIBAH-DEAC (1:1) in such a quantity that the Cl:Nd molar ratio is equal to 2.5. In this case, the conversion is practically complete after 60' (98%). After adding 0.06% w of Irganox® 1520, polymer C is recovered.

In particular, $M_w$ GPC is equal to 350,000 and the dispersion index is equal to 2.9. The $g_M$ value is equal to 1, indicating a linear polymer, the cis content is equal to 96.1% and the Mooney viscosity 45.

Comparative Example 4

Synthesis of Polymer D Effected in a Batch Reactor

Under the same conditions indicated in Example 1, the quantity of Nd versatate of the type Nd4 is reduced to 2.0 mmoles per 1,000 g of butadiene, DIBAH in such a quantity that the final DIBAH:Nd molar ratio is equal to 3.6 and, finally, a mixture of DIBAH-DEAC (1:1) in such a quantity that the Cl:Nd molar ratio is equal to 2.5.

In this case, the conversion is practically complete after 60' (99%). After adding 0.06% w of Irganox® 1520, polymer D is recovered.

In particular, $M_w$ GPC is equal to 330,000 and the dispersion index is equal to 2.6. The $g_M$ value is equal to 1, indicating a linear polymer, the cis content is equal to 97% and the Mooney viscosity 43.

Comparative Example 5

Synthesis of Polymer E Effected in a Batch Reactor

Under the same conditions indicated in Example 1, with a quantity of Nd versatate of the type Nd6 equal to 1.6 mmoles per 1,000 g of butadiene, DIBAH in such a quantity that the final DIBAH:Nd molar ratio is equal to 3.6 and, finally, a mixture of DIBAH-DEAC (1:1) in such a quantity that the Cl:Nd molar ratio is equal to 2.5. In this case, the conversion is practically complete after 60' (99%). After adding 0.06% w of Irganox® 1520, polymer E is recovered.

In particular, $M_w$ GPC is equal to 326,000 and the dispersion index is equal to 2.4. The $g_M$ value is equal to 1, indicating a linear polymer, the cis content is equal to 97.5% and the Mooney viscosity 42.

Comparative Example 6

Polymer Ebis—Example with a Different Starting Reaction Temperature

The same procedure is effected as described in example 5, with a quantity of Nd versatate of the type Nd5 equal to 1.6 mmoles per 1,000 g of butadiene, DIBAH in such a quantity that the final DIBAH:Nd molar ratio is equal to 3.6 and, finally, a mixture of DIBAH-DEAC (1:1) in such a quantity that the Cl:Nd molar ratio is equal to 2.5, with the only difference that the starting temperature is 80° C. In this case, the conversion is practically complete after 30' (99%). After adding 0.06% w of Irganox® 1520, polymer $E_{bis}$ is recovered.

In particular, $M_w$ GPC is equal to 332,000 and the dispersion index is equal to 2.5. The $g_M$ value is equal to 1, indicating a linear polymer, the cis content is equal to 96.5% and the Mooney viscosity 42.

TABLE 1

| polymer | Type of Nd carboxylated. | Nd/ 1000 g BDE | DiBAH:DEAC:Nd | Mw | Mw/Mn | gM |
| --- | --- | --- | --- | --- | --- | --- |
| A | Nd1 | 2.8 | 6:3:1 | 390 | 3.8 | 1.0 |
| B | Nd2 | 2.5 | 5:3:1 | 380 | 3.2 | 1.0 |
| C | Nd3 | 2.2 | 4.2:2.5:1 | 350 | 2.9 | 1.0 |
| D | Nd4 | 2.0 | 3.6:2.5:1 | 330 | 2.6 | 1.0 |
| E | Nd5 | 1.6 | 3.6:2.5:1 | 326 | 2.3 | 1.0 |
| Ebis | Nd5 | 1.6 | 3.6:2.5:1 | 332 | 2.4 | 1.0 |

Examples 7-11

Polymer F, G, H, I, L Synthesized in Continuous Reactors

It is demonstrated that the use of various types of neodymium versatate cause a progressive improvement in the polymerization rate in a way which is inversely proportional to the content of protogenic substances. In particular and analogously to what has been observed in batch reactors, the decrease in the water content causes a progressive decrease in the Mw/Mn index.

Unlike the tests carried out batchwise as described above, however, for particularly clean catalysts, a progressive decrease in the viscosity in styrene is observed, with the same Mooney value, due to a branching revealed by a progressive value of the $g_M$ index (compare polymers F, G, H, I, L).

The branching increases with an increase in the synthesis temperature.

Examples 7-11

Second Synthesis of the Polymers F, G, H, I, L

Anhydrous butadiene and solvent anhydrified by passage on a bed of molecular sieves 3A are fed into a plant consisting of two reactors of 100 litres each, equipped with wall-scraper stirrers and specific temperature control devices, in such ratios that the concentration of the monomer proves to be equal to 12.5% w and the hourly quantity of butadiene is equal to 8 kg/hour. The temperature of the monomer-solvent mixture is established at a value not lower than 35° C. and in any case such as to be able to regulate (together with the quantity of vapour circulating in the jackets of the reactors) a synthesis temperature, in the two reactors, which is constant and centered on a value equal to 80° C. with an oscillation not exceeding 3° C. The DIBAH and mixture of DIBAH-DEAC are fed in order in the same feeding line (1:1 in moles), whereas the Nd-versatate is fed separately directly into the reactor; the quantity of neodymium versatate together with the DIBAH:Nd and DEAC:Nd ratio was established so as to guarantee a sufficient reaction rate for obtaining a total conversion equal to and at least 95% and a Mooney viscosity of the end-product centered on a value of 45. The experimentations differed mainly in the type of Nd-versatate; the variations in the absolute quantities of the various constituents of the catalyst, as also their relative ratios were a direct consequence of the necessity of maintaining the reaction conditions at such a level that the total conversion was not lower than 95% and the Mooney viscosity was centered on a value of 45 with an oscillation not greater than 4 units more or less. Table 2 indicates the synthesis conditions adopted for the preparation of polybutadienes F, G, H, I and L, and the relative characteristics.

Examples 12-14

Preparation of Polymers M, N, O

Anhydrous butadiene and solvent anhydrified by passage on a bed of molecular sieves 3A are fed into the same plant as the previous example, consisting of two reactors of 100 litres each, equipped with wall-scraper stirrers and specific temperature control devices, in such ratios that the concentration of the monomer proves to be equal to 12.5% w and the hourly quantity of butadiene is equal to 8 kg/hour; the temperature of the monomer-solvent mixture is established at a value not lower than 45° C. and in any case such as to be able to regulate (together with the quantity of vapour circulating in the jackets of the reactors) a synthesis temperature, in the two reactors, which is constant and centered on a value equal to 95° C. with an oscillation not exceeding 3° C. The DIBAH and mixture of DIBAH-DEAC are fed in order in the same feeding line (1:1 in moles), whereas the Nd-versatate is fed separately directly into the reactor; the quantity of neodymium versatate together with the DIBAH:Nd and DEAC:Nd ratio was established so as to guarantee a sufficient reaction rate for obtaining a total conversion equal to and at least 97% and a Mooney viscosity of the end-product centered on a value of 45.

The experimentations differed mainly in the type of Nd-versatate; the variations in the absolute quantities of the various constituents of the catalyst, as also their relative ratios were a direct consequence of the necessity of maintaining the reaction conditions at such a level that the total conversion was not lower than 95% and the Mooney viscosity was centered on a value of 45 with an oscillation not greater than 4 units more or less. Table 2 indicates the synthesis conditions adopted for the preparation of polybutadienes M, N, O.

Examples 15-16

Preparation of Polymers P and Q

Anhydrous butadiene and solvent anhydrified by passage on a bed of molecular sieves 3A are fed into the same plant as the previous example, consisting of two reactors of 100 litres each, equipped with wall-scraper stirrers and specific temperature control devices, in such ratios that the concentration of the monomer proves to be equal to 12.5% w and the hourly quantity of butadiene is equal to 8 kg/hour; the temperature of the monomer-solvent mixture is established at a value not lower than 55° C. and in any case such as to be able to regulate (together with the quantity of vapour circulating in the jackets of the reactors) a synthesis temperature, in the two reactors, which is constant and centered on a value equal to 105° C. with an oscillation not exceeding 3° C. The DIBAH and mixture of DIBAH-DEAC are fed in order in the same feeding line (1:1 in moles), whereas the Nd-versatate is fed separately directly into the reactor; the quantity of neodymium versatate together with the DIBAH:Nd and DEAC:Nd ratio was established so as to guarantee a sufficient reaction rate for obtaining a total conversion equal to and at least 99% and a Mooney viscosity of the end-product centered on a value of 45. The experimentations differed mainly in the type of Nd-versatate; the variations in the absolute quantities of the various constituents of the catalyst, as also their relative ratios were a direct consequence of the necessity of maintaining the reaction conditions at such a level that the total conversion was not lower than 99% and the Mooney viscosity was centered on a value of 45 with an oscillation not greater than 4 units more or less. Table 2 indicates the synthesis conditions adopted for the preparation of polybutadienes P and Q.

TABLE 2

| Polym | Type of Nd carbox. | Nd mmoli/1000 g BDE | Di-BAH:DEAC:Nd | T ° C. | Conv 1st reac | Mooney | Mw | Mw/Mn | $g_M$ | Visc cPs |
|---|---|---|---|---|---|---|---|---|---|---|
| F | Nd1 | 3.2 | 8.1:2.9:1 | 80 | 83 | 49 | 400 | 3.8 | 1.0 | 350 |
| G | Nd2 | 2.9 | 6.5:3.1:1 | 80 | 87 | 48 | 385 | 3.2 | 1.0 | 310 |
| H | Nd3 | 2.2 | 4.7:3.1:1 | 80 | 92 | 47 | 365 | 2.8 | 1.0 | 280 |
| I | Nd4 | 2.2 | 3.9:2.5:1 | 80 | 94 | 46 | 340 | 2.6 | 0.98 | 220 |
| L | Nd5 | 2.2 | 3.85:2.6:1 | 80 | 95 | 44 | 330 | 2.3 | 0.97 | 200 |
| M | Nd3 | 2.3 | 4.6:2.8:1 | 95 | 95 | 47 | 365 | 2.9 | 0.96 | 240 |
| N | Nd4 | 2.2 | 3.8:2.45:1 | 95 | 97 | 46 | 335 | 2.6 | 0.94 | 200 |
| O | Nd5 | 2.2 | 3.9:2.5:1 | 95 | 99 | 42 | 320 | 2.4 | 0.92 | 150 |
| P | Nd4 | 2.2 | 3.85:2.4:1 | 105 | 99 | 44 | 330 | 2.5 | 0.86 | 130 |
| Q | Nd5 | 2.2 | 3.9:2.4:1 | 105 | 99 | 47 | 315 | 2.4 | 0.85 | 110 |

Comparative Examples 17-19

Synthesis of Polymers R, S, T

To show the effect of the water content in the Nd salt, the salt Nd1 was used in the same reactor configuration described above at temperatures of 95° C. and 105° C. Table 3 indicates the synthesis conditions adopted for the preparation of polymers R, S and T together with their characteristics.

TABLE 3

| polym | Type of Nd carbox. | Nd mmoli/1000 g BDE | Di-BAH:DEAC:Nd | T °C | Conver 1st reac. | Mooney | Mw | Mw/Mn | $g_M$ | Visc cPs |
|---|---|---|---|---|---|---|---|---|---|---|
| R | Nd1 | 3.2 | 8.4:3:1 | 95 | 86 | 48 | 410 | 3.5 | 1 | 420 |
| S | Nd1 | 3.2 | 8.8:3.1:1 | 105 | 87 | 46 | 420 | 3.7 | 1 | 430 |
| T | Nd2 | 2.9 | 7.5:3.1:1 | 105 | 89 | 44 | 390 | 3.4 | 1 | 365 |

Comments on Tables 2 and 3

The polymerization conditions adopted demonstrate the importance of the Nd:$H_2O$ ratio in the Nd salt for the regulation of the Mw/Mn index value; as already mentioned, with a decrease in the quantity of water, a higher reaction rate is observed, together with a reduction in said index value. A temperature increase, on the other hand, causes a progressive increase in the branching degree as verified by the decrease in the $g_M$ value. A comparative examination of the tests show that only Nd salts characterized by an Nd:$H_2O$ ratio<0.03 produce extensive branched polymers and with viscosity values lower than 150 cPs. If the synthesis is carried out at temperatures higher than 80° C., for Nd salts with a water content higher than 0.3, no branching is observed.

The invention claimed is:

1. A process for preparing polybutadiene, the process comprising polymerizing butadiene in an aliphatic solvent, a cyclo-aliphatic solvent, or both, in the presence of a catalytic system prepared in situ,
wherein
the polymerizing is continuous and conducted at a temperature of from 70° C. to 130° C.,
the catalytic system comprises:
(i) a carboxylate of neodymium soluble in the solvent, comprising a variable quantity of water, in which a $H_2O$/Nd molar ratio is from 0.001/1 to 0.3/1;
(ii) an alkyl compound of aluminum; and
(iii) an alkyl compound of aluminum in which at least one bond of Al comprises an Al—Cl bond,
a total Al/Nd molar ratio is from 4/1 to 12/1,
a Cl/Nd molar ratio is from 2/1 to 6/1, and the polybutadiene has:
a content of 1,4-cis units of higher than 92%;
a Mooney viscosity of from 40 to 60;
a $M_w/M_n$ ratio of from 2 to 3;
a branching index value ($g_m$) of from 0.5 to 0.80; and
an absolute viscosity in styrene of from 100 to 450 cPs, in which the styrene is in solution at 5% at a temperature of 25° C.

2. The process according to claim 1, wherein the neodymium carboxylate is neodymium versatate.

3. The process according to claim 1, wherein the alkyl compound of aluminum (ii) is selected from the group consisting of triethyl aluminum, tri-isobutyl aluminum, diethyl aluminum hydride and di-isobutyl aluminum hydride.

4. The process according to claim 1, wherein the alkyl compound of aluminum in which a bond of Al comprises an Al—Cl bond (iii) is selected from the group consisting of diethyl aluminum chloride, ethyl aluminum sesquichloride, and ethyl aluminum dichloride.

5. The process according to claim 1, wherein the aliphatic solvent, the cyclo-aliphatic solvent, or both, is at least one selected from the group consisting of butane, pentane, hexane, heptane, cyclohexane, and cyclopentane.

6. The process according to claim 1, wherein the neodymium carboxylates are used in a quantity of from 0.1 to 5 mmoles per 1,000 grams of butadiene.

7. The process according to claim 1, wherein the catalytic system is prepared in situ by a process comprising feeding into the reaction environment: (a) part of the alkyl compound of aluminum as an alkylating agent (ii), (b) a mixture comprising the alkyl compound of aluminum, in which at least one bond of Al comprises an Al—Cl bond, as a chlorinating agent (iii) and the alkylating agent (ii), and finally (c) a solution of Nd-carboxylate (i).

8. The process according to claim 1, wherein the Al/Cl molar ratio is from 0.5/1 to 5/1.

9. The process according to claim 1, wherein the polymerizing is at a temperature of from 80° C. to 95° C.

10. The process according to claim 1, wherein the neodymium carboxylate comprises free carboxylic acid, and a RCOOH/Nd molar ratio is less than 0.5/1.

11. The process according to claim 1, wherein the polybutadiene has a content of 1,4-cis units of higher than 95%.

12. The process according to claim 1, wherein the Al/Cl molar ratio is from 0.5/1 to 1.5/1.

13. The process according to claim 1, wherein the neodymium carboxylate comprises free carboxylic acid, and a RCOOH/Nd molar ratio is less than 0.3/1.

14. The process according to claim 1, wherein the neodymium carboxylates are used in a quantity of from 1 to 3 mmoles per 1,000 grams of butadiene.

15. The process according to claim 1, wherein a molar ratio of the neodymium carboxylate (i) to the alkyl compound of aluminum (ii) is from 1/1 to 1/30.

16. The process according to claim 1, wherein a molar ratio of the neodymium carboxylate (i) to the alkyl compound of aluminum in which a bond of Al comprises an Al—Cl bond (iii) is from 1/1.5 to 1/5.

17. The process according to claim 1, wherein a molar ratio of the alkyl compound of aluminum (ii) to the alkyl compound of aluminum in which a bond of Al comprises an Al—Cl bond (iii) is from 0.5 to 5.

18. The process according to claim 1, wherein the polymerizing is continuous, and conducted in two reactors in series.

* * * * *